United States Patent [19]
Heinle et al.

[11] Patent Number: 5,860,593
[45] Date of Patent: Jan. 19, 1999

[54] VEHICLE AIR-CONDITIONING SYSTEM HAVING AN AIR-GUIDING ARRANGEMENT WHICH IS ADJUSTABLE AS A FUNCTION OF THE SUN RADIATION

[75] Inventors: Dieter Heinle, Plüderhausen; Jürgen Maué, Weilheim; Wolfgang Rössner, Leuterhausen; Dietrich Wahl, Stuttgart, all of Germany

[73] Assignee: Mercedes-Benz AG, Germany

[21] Appl. No.: 848,051

[22] Filed: Apr. 29, 1997

[30]      Foreign Application Priority Data

May 2, 1996 [DE] Germany .......................... 196 17 562.3

[51] Int. Cl.⁶ ..................................................... G05D 23/00
[52] U.S. Cl. ......................... 236/91 C; 236/49.3; 165/204
[58] Field of Search ................. 236/91 R, 91 C, 236/91 E, 49.3; 165/42, 43, 203, 204; 454/75; 62/186

[56]             References Cited

U.S. PATENT DOCUMENTS

| | | | |
|---|---|---|---|
| 4,368,843 | 1/1983 | Kai et al. ................................ | 236/49.3 |
| 4,434,932 | 3/1984 | Hara et al. ............................... | 236/49.3 |
| 5,056,421 | 10/1991 | Iida ..................................... | 236/91 C X |
| 5,181,654 | 1/1993 | Yoshimi et al. ....................... | 236/91 C |
| 5,340,021 | 8/1994 | Kajino et al. ........................... | 236/49.3 |
| 5,553,661 | 9/1996 | Beyerlein et al. ...................... | 165/203 |

*Primary Examiner*—Harry B. Tanner
*Attorney, Agent, or Firm*—Evenson, McKeown, Edwards & Lenahan, P.L.L.C.

[57]              ABSTRACT

The vehicle air-conditioning system according to the invention has at least one air-conditioning air duct with at least one air outflow nozzle having an automatically adjustable air guiding arrangement, a sun radiation sensing system, and an air-conditioning control unit which generates control commands for automatically adjusting the air guiding arrangement at least as a function of the output signals of the sun radiation sensing system. The air-conditioning control unit uses output signals from the sun radiation sensing system to determine the local distribution of sun radiation in the area of a particular vehicle seat and, as a function thereof, automatically adjusts the air guiding arrangement or arrangements assigned to the respective vehicle seat.

22 Claims, 2 Drawing Sheets

VEHICLE AIR-CONDITIONING SYSTEM HAVING AN AIR-GUIDING ARRANGEMENT WHICH IS ADJUSTABLE AS A FUNCTION OF THE SUN RADIATION

BACKGROUND AND SUMMARY OF THE INVENTION

This application claims the priority of German application 196 17 562.3-16 filed in Germany on May 2, 1996, the disclosure of which is expressly incorporated by reference herein.

The invention relates to a vehicle air-conditioning system in which air blown by one or several air outflow nozzles into the vehicle interior can be changed as a function of the sun radiation. For this purpose, an automatically adjustable air guiding arrangement on the air outlet nozzles are appropriately controlled by an air-conditioning control unit.

A vehicle air-conditioning system of this, type is described in U.S. Pat. No. 4,434,932. In that system, the air guiding arrangement can be controlled by a control signal of the air-conditioning control unit. When the signal level increases, the air guiding arrangement aims the outflowing air current more at the area of an associated vehicle seat, and when the signal level decreases, it directs the outflowing air more and more away from the area of this seat, or keeps it away from it altogether. The control signal is generated as a function of the output signals of a sun radiation sensing system and an outside temperature sensing system, as well as a determined difference between a predeterminable desired value and an actual value for the interior vehicle temperature (measured by an inside temperature sensing system). The signal level is increased by a certain value to achieve a stronger air-conditioning cooling effect when the measured sun radiation intensity exceeds a given threshold value. In this case, the sun radiation sensing system can be designed to sense separately the sun radiation on the left and right vehicle sides, so that the left and right vehicle seat areas can be air-conditioned separately, dependent upon the sun radiation impinging thereon. In addition, by using a seat occupation sensing system, the air guiding arrangements can be automatically adjusted only for those vehicle seats which are occupied.

The object of the invention is to provide a vehicle air-conditioning system of the above-mentioned type which achieves a comparatively comfortable air conditioning for the individual areas of a respective vehicle by targeted adjustment of the respective air guiding arrangements.

This object is achieved by a vehicle air-conditioning system according to the invention, which is designed such that it can sense not only the intensity but also the direction of the incident sun radiation. By means of this information, and vehicle-specific geometrical data (particularly with respect to the position of the vehicle seats in the vehicle interior and the position of the vehicle window surfaces), the air-conditioning control unit can determine the local sun radiation for each respective vehicle seat, in a locally resolved manner, for each region of the whole area of a vehicle seat, and thus for each body area of an occupant of the seat. The air-conditioning control unit generates control commands for automatic adjustment of the air guiding devices assigned to each seat as a function of this radiation information, so that air can be aimed in a targeted manner at those seat regions (and therefore at those body regions of an occupant of the seat) which are subjected to the greatest sun radiation.

In one embodiment of the invention, a seat position sensing system is provided (as is customary; for example, for automatic seat adjusting systems with a so-called memory function for the user-individually preselected automatic seat adjustment). By means of this seat position sensing system, the air-conditioning control unit can comparatively precisely determine the spatial position of the different areas of the vehicle seat, and thus the spatial position of the individual body regions of an occupant of the seat.

In another embodiment of the invention, cooled air is aimed at those seat regions (and thus at those body regions of a seat occupant) which are subjected to direct sun radiation.

Still another embodiment of the invention includes an air intake blower whose operation can be adjusted as a function of the sun radiation, so that cooled air is blown into the respective seat regions in a direction which depends on both the direction and intensity of the sun radiation.

According to another embodiment of the invention, -at low outside temperatures, warm air can be guided with priority into the seat regions adjacent to the cold vehicle windows, so as to prevent an excessive cooling of the corresponding body regions of a seat occupant.

In still a further embodiment of the invention, when the difference between the actual and the desired interior temperature exceeds a certain amount, so that cold air is supplied with priority into the central upper seat region (and thus at the upper body or head of a seat occupant), the system blows warm air for additionally heating the foot space.

Other objects, advantages and novel features of the present invention will become apparent from the following detailed description of the invention when considered in conjunction with the accompanying drawings.

DETAILED DESCRIPTION OF THE DRAWINGS

Figure 1:
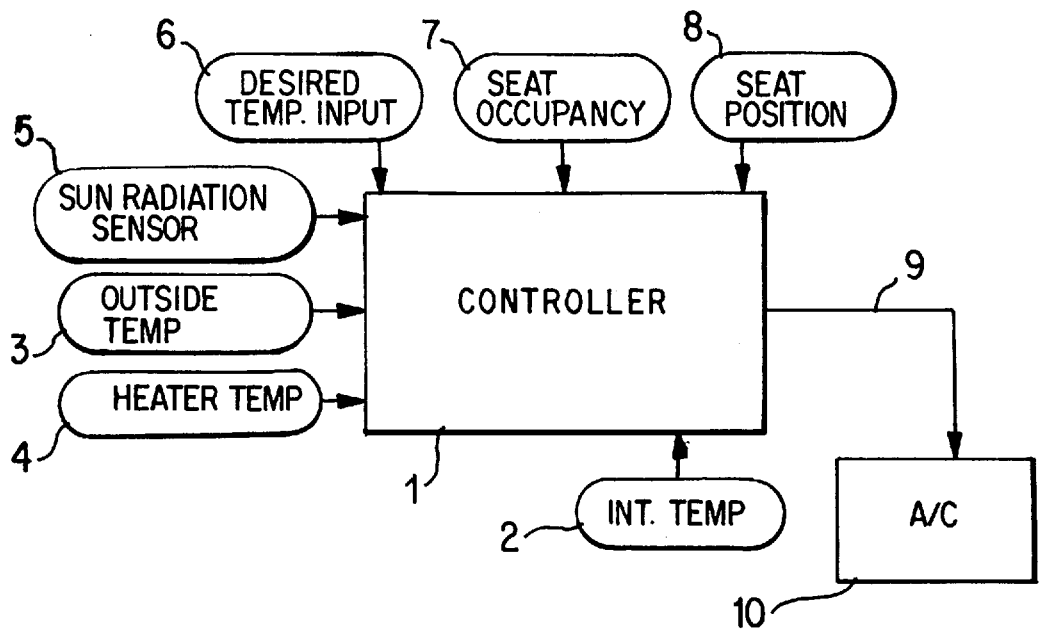
FIG. 1 is a block diagram of a vehicle air-conditioning system which controls air flow as a function of the sun radiation.

The vehicle air-conditioning system illustrated in FIG. 1 automatically controls the air-conditioning of the interior of a motor vehicle. For this purpose, it contains as the central air-conditioning control unit, an air-conditioning controller 1 which among other things, comprises a computer. The air-conditioning controller 1 processes the output signals of several sensors supplied to it; in particular: an interior air temperature sensor 2; an outside air temperature sensor 3; a temperature sensing system 4 for measuring the air temperature of a heater heat exchanger which is located within of the air-conditioning unit; as well as a sun radiation sensor 5. The latter sensor is designed so that it senses the intensity as well as the direction of the incident sun radiation on the vehicle and its the vehicle interior. Such sun radiation sensing systems are well known and consist of one or several sun sensor elements which are mounted at a suitable point on the exterior of the vehicle or inside the vehicle compartment (for example, on top of a dashboard).

A user operable desired interior-temperature value control element 6 provides the air-conditioning controller 1 with information concerning the interior temperature desired by the user which it requires for regulating the interior temperature. Furthermore, a seat occupation sensing system 7 provides the air-conditioning controller 1 with information as to which vehicle seats are occupied. This seat occupation sensing system 7 may, for example, consist conventionally of electric switching elements which are arranged in the seat surfaces, and which switch as soon as the vehicle seat is occupied. Alternatively, the vehicle occupation sensing system may consist of electric switching elements housed in the seat belt mechanisms, which switch when the seat occupant puts on the seat belt. Also, a manual seat occupation sensing system may be considered, in which the vehicle occupant indicates his presence by way of corresponding key. As an additional alternative, the seat occupation sensing system may utilize infrared sensors. A seat occupation sensor element need not necessarily be assigned to the driver's seat, because its occupation is generally the result of the activated vehicle operation.

As additional input signal information, the air-conditioning controller 1 also receives output signals from a seat position sensing system 8 of a conventional construction, such as used, for example, in automatic seat adjusting systems in which the user can bring the different adjustable seat elements into previously stored positions by activating a memory function via a single operating element. (In such systems, a seat position sensing system monitors the reaching of the desired positions of the individual seat elements.) The seat position sensing system thus provides the air-conditioning controller 1 with precise information concerning the spatial position of the particular vehicle seat, and therefore also concerning the spatial position of a seat occupant.

Utilizing the above-indicated input information, the air-conditioning controller 1 can detect the momentary air-conditioning situation for the vehicle interior, and automatically regulate the air conditioning (including ventilating, heating or cooling). For this purpose, the air-conditioning controller 1 emits control signals 9 to an air-conditioning unit 10 which sets the air temperature in a manner determined by the control signals 9; that is, it brings the air to the required temperature and blows it into the interior.

Figure 2:
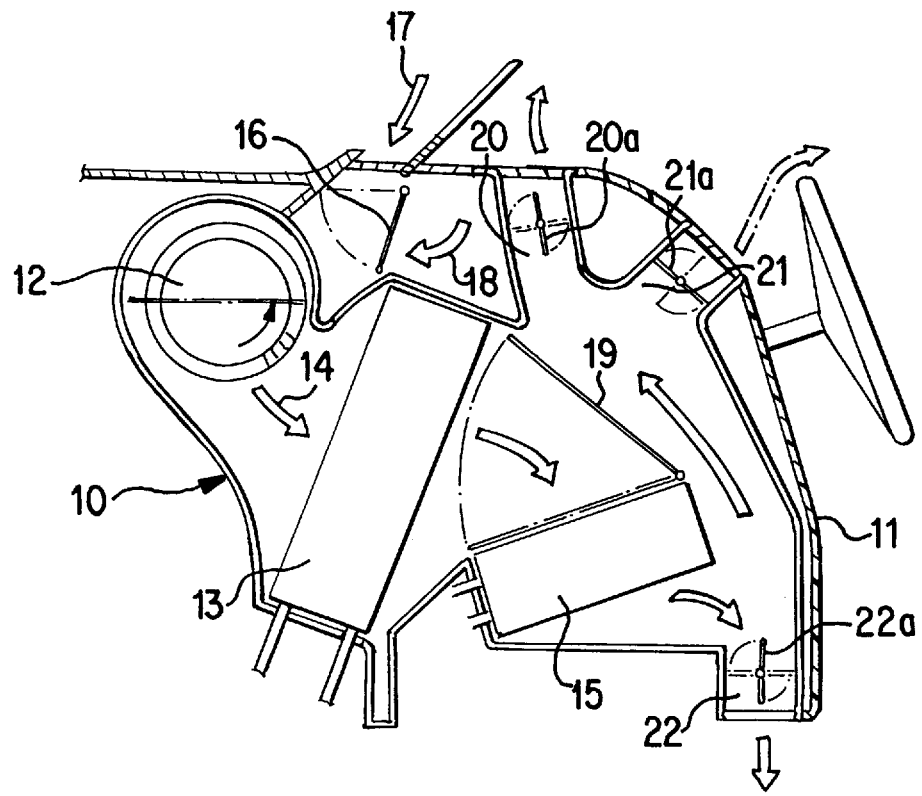
FIG. 2 is a sectional view of an air-conditioning unit of the vehicle air-conditioning system of FIG. 1.

FIG. 2 shows a possible layout of the air-conditioning unit 10 in the installed position, within the area of a dashboard 11 of the motor vehicle. The air-conditioning unit 10 includes an air intake blower 12 driven by an electric motor, a coolant evaporator 13 for cooling the air flow 14 taken in by the blower 12, a heater heat exchanger 15 adjoining downstream, an ambient air flap 16 for controlling the intake of fresh air 17 or ambient (interior) air, an air mixing flap 19 for controlling the mixture ratio of air heated by means of the heater heat exchanger 15 to air which is not heated and is guided past the heater heat exchanger, as well as a plurality of air ducts, including, for example, a defroster air duct 20, a ventilating air duct 21, a leg space air duct 22 and a rear compartment air duct (not shown).

Each air duct 20, 21, 22 has at least one air flap 20a, 21a, 22a. These air flaps 20a, 21a, 22a, as well as the ambient air flap 16 and the air mixing flap 19, are operated by actuators (not shown) controlled by the air-conditioning controller 1 by means of the control signals 9. By means of the control signals 9, the air-conditioning controller 1 controls also the other components of the air-conditioning unit 10 to achieve automatic air-conditioning control. The rotational speed of the air intake blower 12 and the position of the air mixing flap 19 are automatically controlled to reach the desired interior air temperature as fast as possible, and then maintains it.

Figure 3:
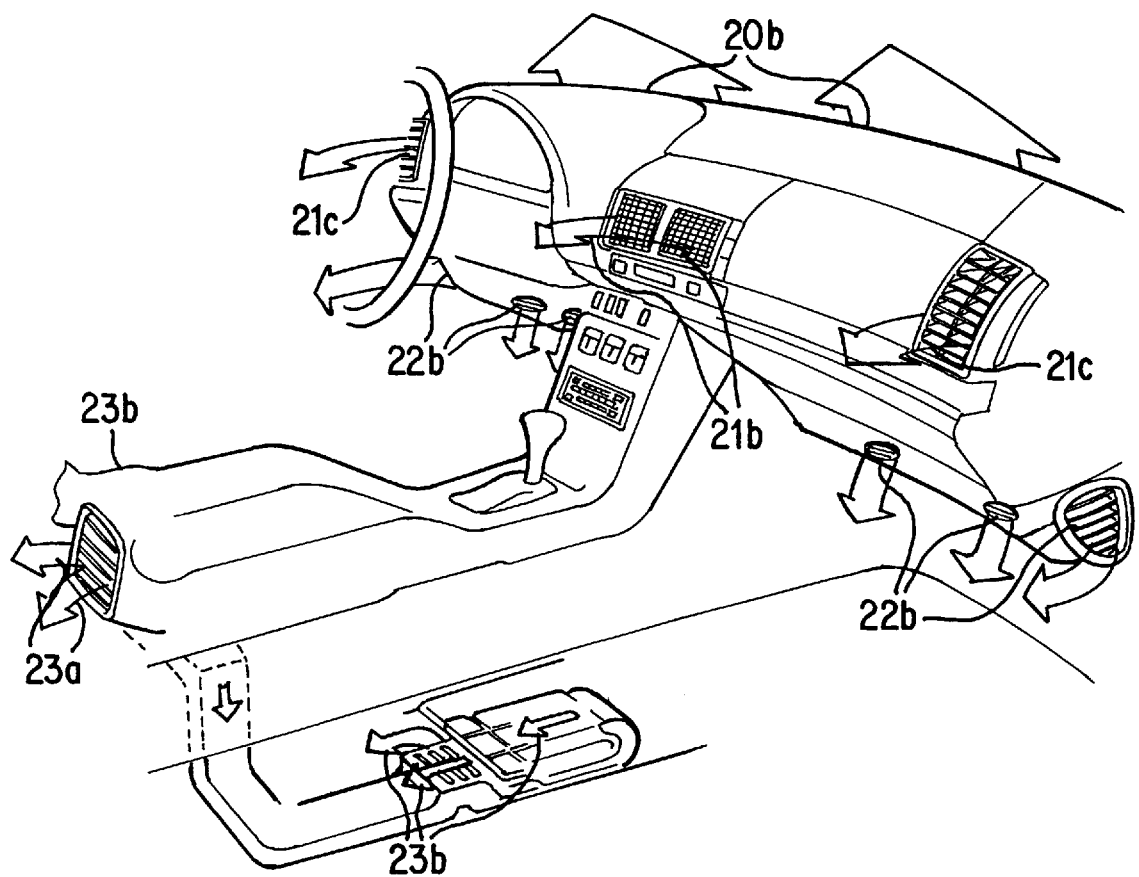
FIG. 3 is a perspective view of the forward interior region of a vehicle containing the vehicle air-conditioning system of FIG. 1.

The air-conditioning air ducts 20, 21, 22 each have one or several outlet openings with an outflow nozzle. Such nozzles are illustrated in FIG. 3, which shows the defroster nozzles 20b, the center ventilation nozzles 21b, the lateral ventilation nozzles 21c, the foot space nozzles 22b as well as the central 23a and lateral rear compartment nozzles 23b. As also illustrated in FIG. 3, at least some of the nozzles 21b, 21c, 23a have inserts in the form of adjustable air guiding grids by means of which the direction of the outflowing air can be changed. According to the invention, these air guiding grids can be operated analogously to the flaps shown in FIG. 2, by way of actuators (not separately shown) which, in turn, can be controlled by the air-conditioning controller 1 via the control signals 9.

In most known air-conditioning systems, the air guiding grids can be adjusted only manually, which requires frequent manipulation by the vehicle occupants. When the sun radiation is strong, the occupants' body parts directly exposed to the sun light will heat up considerably. The occupants will therefore try to guide the cooled air flow to the body parts exposed to the sun, by suitable adjustment of the air guiding grids. When the driving direction is changed frequently, such manual adjustment of the air guiding grids is required just as frequently, to change the air blow-out direction. In contrast, the automatic air guiding grid adjustment according to the invention makes it possible to automatically adjust the air guiding grids so that cooled air is always directed with priority at the body regions of a vehicle occupant which are most stressed by the sun radiation. The speed and temperature of the air flows coming out of the respective outflow nozzles are automatically regulated by the air-conditioning controller 1 so that the vehicle occupants also feel thermally comfortable at the exposed body regions. This makes frequent manual air guiding grid adjustments unnecessary to achieve a globally and locally comfortable interior air conditioning, particularly in summer weather conditions.

In detail, this is achieved as follows by the air-conditioning unit according to FIGS. 1 to 3. The air-conditioning controller 1 processes the output signals of the sensing units 2 to 5, 7, 8 and of the desired interior-temperature value control element 6, and generates suitable control signals 9 for automatically controlling the components of the air-conditioning unit 10, as a function of these inputs. This includes control of the rotational speed of the air intake blower 12, as well as the positions of the ambient air flap 16, the air mixing flap 19 and the air flaps 20a, 21a, 22a in the different air-conditioning ducts 20 to 22. In particular, it also includes the positions of the various air guiding grids of the outflow nozzles 21b, 21c, 23a in order to carry out the conditioning and the distribution of the air to be supplied to the vehicle interior according to the situation.

On the one hand, this manner of operations includes controlling the interior air temperature as rapidly as possible to the given desired value, and maintaining it there. On the other hand, it also includes adjustment of the blowing directions, which is automatically optimized (that is, directed to body areas which are exposed to direct sun light) as a function of the sun radiation for the air-conditioning air flows coming out of the different outflow nozzles, by suitable adjustment of the air guiding grids. As a prerequisite, the required vehicle-specific geometrical data are stored in the air-conditioning controller 1 in order to be able to determine, from the direction of the incident sun radiation, which vehicle interior areas are in each case exposed to direct sun light. That is, the air-conditioning controller 1 utilizes an algorithm easily be implemented by a person skilled in the art, by which it determines whether and possibly which vehicle interior areas are exposed to the direct sun radiation, based on the vehicle-specific geometrical data and the data concerning the direction of the incident sun radiation obtained from the signals of the sun radiation sensing system 5.

In order to be able to draw conclusions therefrom with respect to the body regions of the vehicle occupants which are directly exposed to the sun, the air-conditioning controller 1 also analyzes the signals obtained from the seat position sensing system 8 and from the seat occupation sensor system 7. From the latter signals it can be determined which vehicle seats are occupied, so that it is necessary to perform a sun-radiation-dependent adjustment only for those air guiding grids which are assigned to seats in which a vehicle occupant is sitting. From the signals of the seat position sensing system 8, the computer in the air-conditioning controller 1 receives precise information concerning the spatial position of each vehicle seat in the vehicle interior—individually for each adjustable seat element of a particular seat. In this manner, the air-conditioning controller 1 can determine the spatial position of the individual body regions of the occupants seated in the vehicle interior.

By combining the latter information with the obtained data concerning the vehicle interior areas affected by direct sun radiation, the air-conditioning controller 1 can now determine the spatial position of the body regions of the respective vehicle occupants which are directly exposed to the sun. As a function of this information, the air-conditioning controller 1 generates, as part of the control signals 9, control commands for the actuators of the horizontally and vertically adjustable air guiding grids of the outflow nozzles of the individual air-conditioning ducts so that the outflowing conditioned air is aimed mainly at the body regions of vehicle occupants which are exposed to the direct sun radiation. At the same time, the air-conditioning controller 1 regulates the voltage of the blower motor of the air intake blower 12 (and thus its rotational speed) so that it supplies an air flow rate which corresponds to the thermal comfort requirements.

As an additional measure, the air-conditioning unit makes an outside-temperature-dependent adjustment of the air guiding grids. At low outside temperatures, the vehicle occupants are exposed to a considerable heat radiation exchange with the cold windows of the vehicle compartment. In such cases, it is advantageous to have warm air act in a targeted manner on those body regions, for example, the shoulders of the vehicle occupants, which primarily radiate heat to the windows. This is permitted by means of the air-conditioning unit because of the fact that, at outside temperatures below a predeterminable threshold value, the air guiding grids of those nozzles which are assigned to the occupied vehicle seat, are automatically adjusted so that warm air, in addition to the heating of the foot space, is mainly directed to these body regions.

The air-conditioning system also automatically adjusts the air guiding grids in the case of either cooling or heating, when the difference between the desired interior-temperature and the actual interior-temperature exceeds a given amount. In this case, it is required to blow cold or heated air at the vehicle occupants in a targeted manner, for which the air-conditioning system conditions the air correspondingly and adjusts the air guiding grids of the outflow nozzles so that, in the cooling operation in an overriding manner and, in the heating operation, in addition to the feet, the blowing takes place onto the upper body and the face region of the respective vehicle occupant.

The described air-conditioning unit therefore offers a high air-conditioning comfort which includes particularly the targeted cooling of body regions affected by direct sun radiation. Conventional air-conditioning systems, in which the air guiding grids can be adjusted only manually, can be changed relatively easily into air-conditioning systems according to the invention by retrofitting with actuators for operating the air guiding grids and by the implementation of the described algorithm for the sun-radiation-dependent and seat-position-dependent generating of corresponding control commands for the actuators in the computer of the air-conditioning controller 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle air-conditioning system comprising:
   at least one air-conditioning air duct having at least one air outflow nozzle with an automatically adjustable air guiding arrangement;
   a sun radiation sensing system; and
   an air-conditioning control unit which generates control commands for automatic adjustment of the air guiding arrangement as a function of at least output signals of the sun radiation sensing system;
   wherein the air-conditioning control unit uses the output signals of the sun radiation sensing system to determine local distribution of sun radiation within the area of a particular vehicle seat, and generates said control commands for automatic adjustment of the air guiding arrangement assigned to the particular vehicle seat to control a flow of cooled air to spaces within the area of the particular vehicle seat as a function of the local distribution of sun radiation thereon.

2. Vehicle air-conditioning system according to claim 1, further comprising a seat position sensing system, wherein:
   when determining a distribution of sun radiation along areas of a vehicle seat, the air-conditioning control unit uses output signals of the seat position sensing system for determining the spatial position of different vehicle seat areas.

3. Vehicle air-conditioning system according to claim 1, wherein the air-conditioning control unit automatically adjusts at least one air guiding arrangement assigned to the particular vehicle seat so that cooled air is aimed in an overriding manner, at seat regions which are subjected to direct sun radiation.

4. Vehicle air-conditioning system according to claim 2, wherein the air-conditioning control unit automatically adjusts at least one air guiding arrangement assigned to the particular vehicle seat so that cooled air is aimed in an overriding manner, at seat regions which are subjected to direct sun radiation.

5. Vehicle air-conditioning system according to claim 1, further comprising an air intake blower whose blower output can be changed as a function of output signals of the sun radiation sensing system.

6. Vehicle air-conditioning system according to claim 3, further comprising an air intake blower whose blower output can be changed as a function of output signals of the sun radiation sensing system.

7. Vehicle air-conditioning system according to claim 4, further comprising an air intake blower whose blower output can be changed as a function of output signals of the sun radiation sensing system.

8. Vehicle air-conditioning system according to claim 1, comprising an outside-temperature sensing system, wherein:

the air-conditioning control unit automatically adjusts at least one air guiding arrangement as a function of output signals of the outside-temperature sensing system, so that supplied warm air is guided to the foot space and by the at least one air guiding arrangement in an overriding manner into those seat regions of the pertaining vehicle seat which are adjacent to a vehicle window.

9. Vehicle air-conditioning system according to claim 2, comprising an outside-temperature sensing system, wherein:

the air-conditioning control unit automatically adjusts at least one air guiding arrangement as a function of output signals of the outside-temperature sensing system, so that supplied warm air is guided to the foot space and by the at least one air guiding arrangement in an overriding manner into those seat regions of the pertaining vehicle seat which are adjacent to a vehicle window.

10. Vehicle air-conditioning system according to claim 3, comprising an outside-temperature sensing system, wherein:

the air-conditioning control unit automatically adjusts at least one air guiding arrangement as a function of output signals of the outside-temperature sensing system, so that supplied warm air is guided to the foot space and by the at least one air guiding arrangement in an overriding manner into those seat regions of the pertaining vehicle seat which are adjacent to a vehicle window.

11. Vehicle air-conditioning system according to claim 5, comprising an outside-temperature sensing system, wherein:

the air-conditioning control unit automatically adjusts at least one air guiding arrangement as a function of output signals of the outside-temperature sensing system, so that supplied warm air is guided to the foot space and by the at least one air guiding arrangement in an overriding manner into those seat regions of the pertaining vehicle seat which are adjacent to a vehicle window.

12. Vehicle air-conditioning system according to claim 1, further comprising an interior temperature sensing system and a device for determining the difference between a predeterminable desired interior temperature value and an actual interior temperature sensed by the interior temperature sending system, wherein:

the air-conditioning control unit automatically adjusts at least one air guiding arrangement as a function of a difference between a desired interior temperature and an actual interior temperature, so that when this interior temperature difference exceeds a predeterminable amount, at least one of the following is implemented: supplied warm air is guided to the foot space, and cold air is guided by the at least one air guiding arrangement in an overriding manner into a central upper area of the pertaining vehicle seat.

13. Vehicle air-conditioning system according to claim 2, further comprising an interior temperature sensing system and a device for determining the difference between a predeterminable desired interior temperature value and an actual interior temperature sensed by the interior temperature sending system, wherein:

the air-conditioning control unit automatically adjusts at least one air guiding arrangement as a function of a difference between a desired interior temperature and an actual interior temperature, so that when this interior temperature difference exceeds a predeterminable amount, at least one of the-following is implemented: supplied warm air is guided to the foot space, and cold air is guided by the at least one air guiding arrangement in an overriding manner into a central upper area of the pertaining vehicle seat.

14. Vehicle air-conditioning system according to claim 3, further comprising an interior temperature sensing system and a device for determining the difference between a predeterminable desired interior temperature value and an actual interior temperature sensed by the interior temperature sending system, wherein:

the air-conditioning control unit automatically adjusts at least one air guiding arrangement as a function of a difference between a desired interior temperature and an actual interior temperature, so that when this interior temperature difference exceeds a predeterminable amount, at least one of the following is implemented: supplied warm air is guided to the foot space, and cold air is guided by the at least one air guiding arrangement in an overriding manner into a central upper area of the pertaining vehicle seat.

15. Vehicle-air-conditioning system according to claim 5, further comprising an interior temperature sensing system and a device for determining the difference between a predeterminable desired interior temperature value and an actual interior temperature sensed by the interior temperature sending system, wherein:

the air-conditioning control unit automatically adjusts at least one air guiding arrangement as a function of a difference between a desired interior temperature and an actual interior temperature, so that when this interior temperature difference exceeds a predeterminable amount, at least one of the following is implemented: supplied warm air is guided to the foot space, and cold air is guided by the at least one air guiding arrangement in an overriding manner into a central upper area of the pertaining vehicle seat.

16. Vehicle air-conditioning system according to claim 8, further comprising an interior temperature sensing system and a device for determining the difference between a predeterminable desired interior temperature value and an actual interior temperature sensed by the interior temperature sending system, wherein:

the air-conditioning control unit automatically adjusts at least one air guiding arrangement as a function of a difference between a desired interior temperature and an actual interior temperature, so that when this interior temperature difference exceeds a predeterminable amount, at least one of the following is implemented: supplied warm air is guided to the foot space, and cold air is guided by the at least one air guiding arrangement in an overriding manner into a central upper area of the pertaining vehicle seat.

17. Method of operating a vehicle air-conditioning system having at least one air flow outlet with an automatically adjustable air guiding arrangement, said method comprising the steps of:

sensing a local distribution of solar radiation incident over a space occupied by a vehicle seat; and automatically adjusting said air guiding arrangement to provide a flow of cooled air to areas within said space, as a function of said local distribution of solar radiation.

18. Method according to claim 17, wherein said automatically adjusting step comprises adjusting a distribution of said air flow within said space as a function of said local distribution of solar radiation.

19. Method according to claim 18, wherein said distribution of air flow includes directing cooled air particularly to seat regions which are subjected to direct sunlight.

20. Method according to claim 17, wherein said step of sensing a local distribution of sunlight comprises the steps of:

sensing at least one of direction and intensity of sunlight incident on said vehicle by means of a plurality of sensors;

sensing a position of said vehicle seat within said vehicle; and using sensed information concerning incident sunlight and concerning said position of said vehicle seat, together with stored information concerning interior geometry of said vehicle to determine said local distribution of sunlight.

21. A vehicle air-conditioning system comprising:

at least one air-conditioning air duct having at least one air outflow nozzle with an automatically adjustable air guiding arrangement;

a sun radiation sensing system; and an air-conditioning control unit which generates control commands for the automatic adjustment of the air guiding arrangement as a function of at least output signals of the sun radiation sensing system;

wherein the air-conditioning control unit uses the output signals of the sun radiation sensing system to determine areas of a body of an occupant of a particular vehicle seat which areas are exposed to sun radiation, and generates said control commands for automatic adjustment of the air guiding arrangement assigned to the particular vehicle seat to direct a flow of air to said areas which are exposed to sun radiation thereon.

22. Method of operating a vehicle air-conditioning system having at least one air flow outlet with an automatically adjustable air guiding arrangement, said method comprising the steps of:

sensing a local distribution of solar radiation incident over a space occupied by a vehicle seat to determine areas of a body of an occupant of a particular vehicle seat which areas are exposed to solar radiation; and automatically adjusting said air guiding arrangement to provide a flow of cooled air to areas which are exposed to solar radiation.

* * * * *